Feb. 1, 1949.     C. W. JARVIS     2,460,790
GENERATOR
Filed March 11, 1946
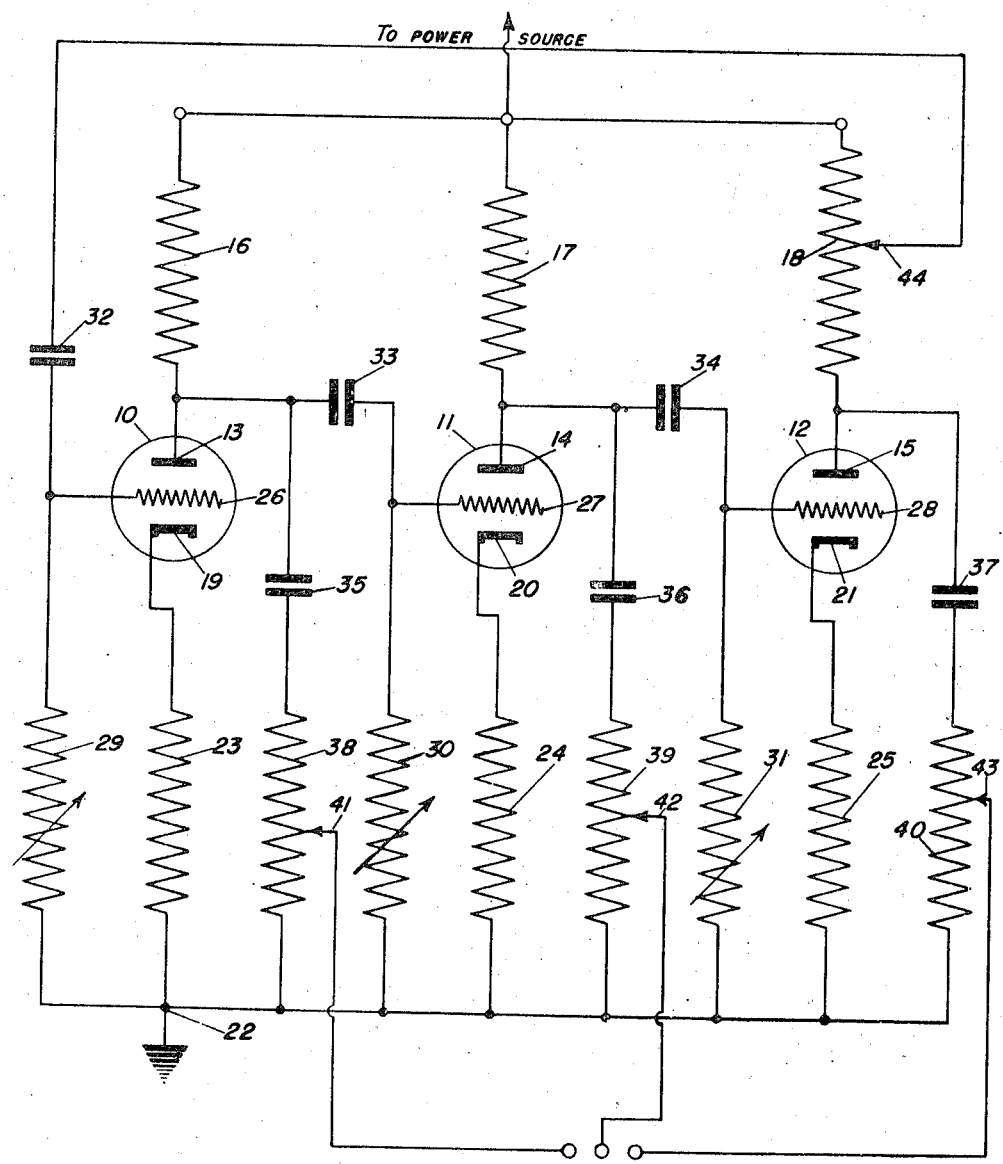
INVENTOR
CHARLES W. JARVIS
BY
ATTORNEY Patented Feb. 1, 1949

2,460,790

UNITED STATES PATENT OFFICE 2,460,790

GENERATOR

Charles W. Jarvis, Washington, D. C., assignor to the United States of America as represented by the Secretary of the Navy Application March 11, 1946, Serial No. 653,491

4 Claims. (Cl. 175—363)

This invention relates to an electronic polyphase generator and has for its object to provide a generator which affords close control of power supplied in the various phases and wherein the entire generation is derived from a vacuum tube circuit.

The invention has an additional object to provide an electronic polyphase generator wherein the control of power results essentially from the control of the output voltage.

The invention has as a further object to provide a polyphase generator wherein the generation is derived entirely from electronic tubes.

The invention has as a further object to provide a simple polyphase generator free of all moving parts which is light in weight and which may be mounted in a small space.

The invention has as a further object the provision of a structure described in the specification and claims, and shown in the drawing wherein:

The figure is a circuit diagram of an electronic polyphase generator in accordance with the invention. Reference is made to the drawing and the parts will be described according to the numerals on the drawing. The electronic generator of polyphase alternating currents comprises a number of thermionic tubes, the number of tubes used being equal to the desired number of phases. As an example, three tubes numbered 10, 11, 12 have been selected to demonstrate the use of this invention as a 3-phase alternating-current generator, although this invention is not limited to 3-phase operation but may be used to generate as many phases of alternating current as are desired. A suitable direct current power supply (not shown) supplies the necessary power to the anode 13, 14, 15 of each tube through anode resistors 16, 17, 18. The cathode 19, 20, 21 of each tube is connected to a suitable common ground 22 through cathode resistors 23, 24, 25. The resistance values of these cathode resistors should be substantially mutually equal. The control grid 26, 27, 28 of each tube is connected to a common ground, 22, through a grid resistor 29, 30, 31. For a particular frequency of operation of this device the value of the grid resistors is constant, each resistor being substantially equal in value to the other grid resistors in the circuit. To allow this device to operate over a range of frequencies it is desirable, though unnecessary to the proper operation of the device, to make the grid resistors 29, 30, 31 variable. To permit the operator to change the frequency of operation more easily the grid resistors may be ganged together mechanically. Each control grid 26, 27, 28 is also coupled to the anode of the preceding tube through a coupling capacitor 32, 33, 34. The capacitances of these coupling capacitors should be approximately mutually equal. Attached to each anode is a capacitor 35, 36, 37 and a variable-tap resistor 38, 39, 40 connected in series to the common ground 22. A polyphase alternating voltage may be tapped off the resistors 38, 39, 40 by the contactor 41, 42, 43. The amplitude of output voltage for any particular phase may be varied by adjustment of the proper rheostat contactor.

In the device as set forth in the invention a suitable number of tubes are so connected that an impulse will circulate continuously and in a definite order. In order to obtain the proper polyphase operation, between the anode of one tube and the anode of the following tube a phase shift of 360/n degrees (where n equals the number of phases desired) is necessary. In our example 120° phase shift between stages is necessary, and is obtained through the combined effects of the phase shift of the vacuum tube and the phase shifting networks 32 and 29, 33 and 30, 34 and 31. The amplitude of alternating voltage fed to grid 26 of tube 10 from anode 15 of tube 12 can be varied by changing the position of the rheostat contactor 44 on rheostat 18. Varying the voltage amplitude at the said point will change the amplitude of the alternating voltage at each anode and hence the amplitude of the output voltage.

If the power supplied by this device is insufficient for the purposes desired, amplification may be provided by amplifiers whose use is familiar to those skilled in the art of electronics.

Obviously many modifications and variations of the present invention are possible in the light of the above teachings. It is therefore to be understood that within the scope of the appended claims the invention may be practiced otherwise than as specifically described.

I claim:

1. A generator, energizable by direct current, for providing polyphase alternating current, said generator comprising a plurality of electron discharge tubes each including an anode, a cathode and a grid, resistors, one for each tube, and each connected, at one end, to the positive direct current terminal, and at its other end to the anode of a corresponding tube, cathode resistors connecting the cathodes of said tubes to the negative direct current terminal, means, each including a capacitor, connecting the anode of each tube with the grid of the succeeding tube, thus forming a closed loop of the tubes, other means each including a resistor and a capacitor connected in series and each connected at one end to the anode of a corresponding tube and at its other end to the cathode thereof through a corresponding one of the cathode resistors, and terminals connected to said last-named means serving as the polyphase output.

2. A generator as defined in claim 1, wherein the last-named resistors have shiftable contacts which constitute the alternating current output terminals.

3. A generator as defined in claim 1, wherein one of the first-named means includes also a variable resistor.

4. A polyphase generator comprising a plurality of electron discharge tubes, each including an anode, a cathode and a grid, means, including a source of direct current and anode and cathode resistors, connected in series with the respective terminals of said source and the anodes and cathodes of the tubes, for supplying direct current to the anodes and cathodes thereof, capacitors respectively connecting the anode of each tube to the grid of the succeeding tube, a plurality of capacitors, and a plurality of resistors having one common terminal and each having its remaining terminal connected to the anode of a corresponding tube in series through one of said last-named capacitors, each resistor having a tap constituting one terminal of the polyphase alternating current output.

CHARLES W. JARVIS.

REFERENCES CITED

The following references are of record in the file of this patent:

UNITED STATES PATENTS

| Number | Name | Date |
|---|---|---|
| 1,926,821 | Stansbury | Sept. 12, 1933 |
| 1,954,028 | Stansbury | Apr. 10, 1934 |
| 2,094,794 | Herskind | Oct. 5, 1937 |